Patented Nov. 27, 1923.

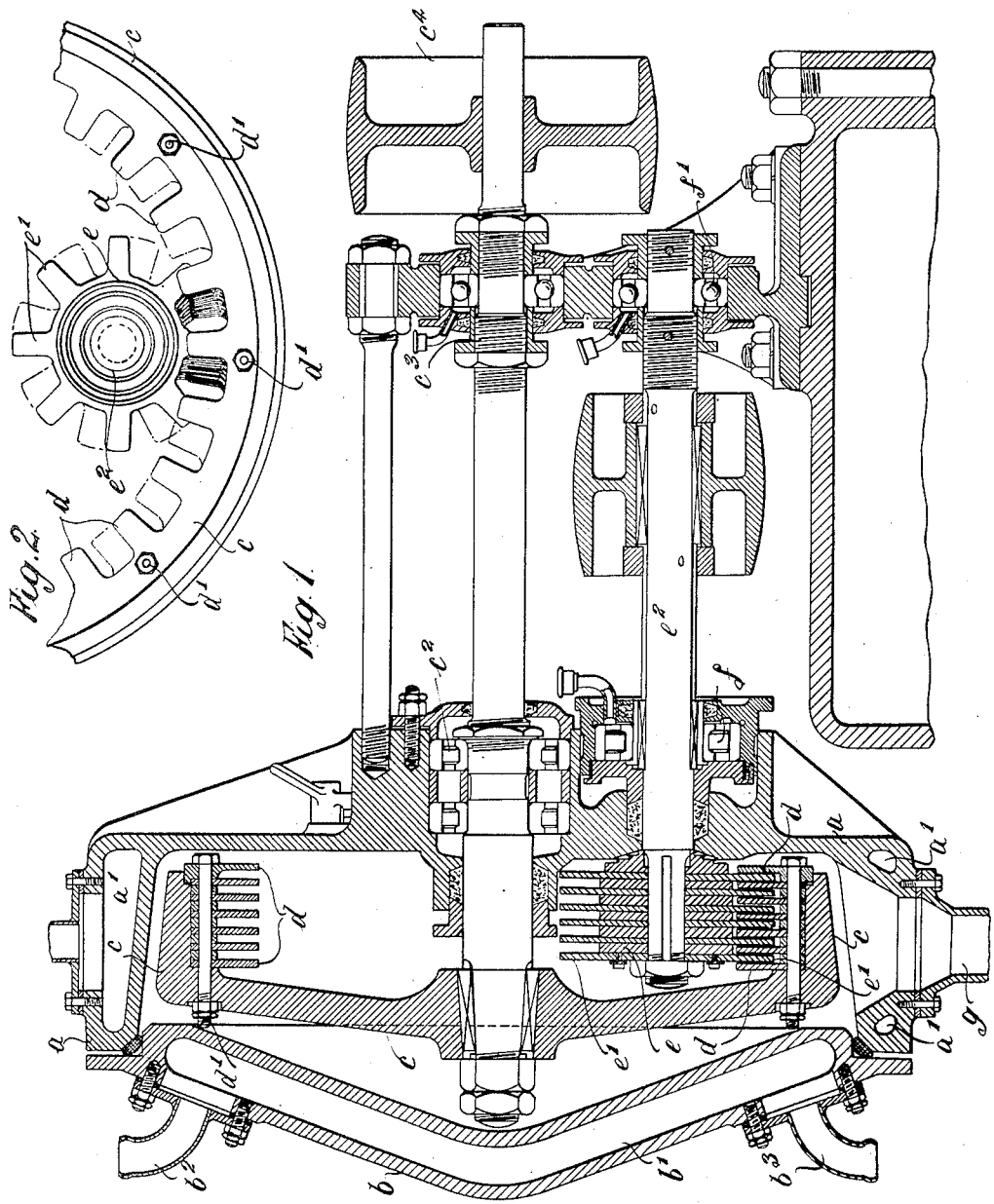

1,475,638

UNITED STATES PATENT OFFICE.

ARCHIBALD MONTGOMERY LOW, OF LONDON, ENGLAND, ASSIGNOR TO THE LOW ENGINEERING COMPANY LIMITED, OF LONDON. ENGLAND, A CORPORATION OF GREAT BRITAIN.

MIXING APPARATUS.

Application filed January 13, 1923. Serial No. 612,503.

*To all whom it may concern:*

Be it known that I, ARCHIBALD MONTGOMERY LOW, residing at London, England, a subject of the King of Great Britain and Ireland, have invented certain new and useful Improvements in Mixing Apparatus, of which the following is a specification.

This invention relates to mixing apparatus.

It has been hitherto proposed to mix materials, for example, chocolate or oil and water to form an emulsion, or other substances which may be in a more or less liquid condition mechanically by agitation, but up to the present it has been found difficult to secure a really intimate contact between such materials and the mixing members owing to many reasons, such as convection, etc.

The invention relates to that type of mixing apparatus which include rotary drums or equivalents disposed within a stationary casing, said drums being provided with peripheral beaters in such a manner that the beaters of one drum interengage the beaters of the other drum without actual contact, and the invention consists primarily in a novel arrangement of said drums and beaters in which one drum is located within the other and rotatable in the same plane, the beaters on the outer drum being disposed interiorly and those of the inner drum exteriorly thereof. The axes of the drums are so displaced in relation to one another that the inner drum may be within the outer drum to one side of its centre and the beaters of the drums are arranged in progressive overlapping relation and shaped to permit the beaters of one drum to be withdrawn through those of another drum.

A practical embodiment of the invention is shown in the accompanying drawings. Fig. 1 being a vertical longitudinal section and, Fig. 2 a detail view of the beaters on an enlarged scale.

The apparatus shown in said drawings comprises a stationary casing or chamber $a$ suitably jacketed as at $a^1$ for reception or circulation of a heating or cooling medium, and provided with an inlet or inlets (not shown) for the material or materials to be mixed and with a door $b$ at one side to provide access to the interior, and through which the mixing members or parts thereof may be withdrawn when necessary said door being also shown as jacketed at $b^1$ and provided with inlet and outlet $b^2$ $b^3$ for the heating or cooling medium. Within said casing $a$ there is rotatably mounted a drum $c$ whose outer periphery lies close to the inner wall of the casing, this drum being provided interiorly with a number of inwardly directed beaters $d$ spaced apart and shown as secured in position by bolts $d^1$. The drum shaft $c^1$ is carried to the exterior of the drum $c$ and mounted in appropriate bearings $c^2$ $c^3$ outside which is mounted a driving pulley $c^4$. Within the contour of the drum, and suitably at the lower part thereof (the inlet for the material being at the upper part) is disposed a second drum $e$ of smaller diameter, and which consists of or is provided peripherally with a number of mixing members in the form of spaced beaters $e^1$ which extend between the beaters $d$ of the main drum $c$. The beaters $d$ and $e^1$ of the two drums lie closely together where they intersect or pass as clearly shown in the drawings but without direct contact and are so arranged that each beater lies slightly in advance of that one before it or adjacent thereto so that they more or less progressively overlap as indicated in Fig. 2. The second drum $e$ is driven in a direction opposite to that of the drum $c$ enabling high relative speeds between the beaters of the respective drums to be obtained, and resulting in a very intimate mixture of the materials. The shaft $e^2$ of said second drum also extends to the exterior of the casing and is provided between its bearings $f$ $f^1$ with a separate driving pulley $f^2$. The shape and arrangement of the beaters is such that those of one drum may be withdrawn laterally through those of the other drum when it is desired to remove one of said drums from the casing without the other.

A suitable discharge $g$ adapted to be controlled as by a cock or valve is provided for the finished product from the casing, this product being flung into the discharge by the action of the beaters, but in some cases, or for certain materials it may be desirable to assist this discharge by auxiliary suction or forcing means.

What I claim as my invention and desire to secure by Letters Patent of the United States is:—

1. A mixing apparatus for the purpose specified comprising a stationary casing, and two relatively rotatable drums mounted in said casing one within the other and provided with interengaging beaters cooperating without contact, the beaters of each drum being spaced longitudinally with respect to the axes of rotation of the drums.

2. A mixing apparatus for the purpose specified comprising a stationary casing and two relatively rotatable drums mounted in said casing one within the other and provided with interengaging beaters cooperating without contact, said beaters projecting in radial disposition from the interior and exterior peripheries of the drums respectively, with the beaters of each drum arranged in annular series spaced apart longitudinally of the axes of rotation of the related drum.

3. A mixing apparatus for the purpose specified comprising a stationary casing, and two relatively rotatable drums mounted in said casing one within the other and provided with interengaging beaters cooperating without contact, said beaters projecting in radial disposition from the interior and exterior peripheries of the drums respectively, the beaters of each drum being arranged in annular series spaced apart longitudinally of the axes of rotation of the drums with the beaters of each series in annular spacement, the beaters of both drums being of such relative width and annular spacement that those of one drum can be withdrawn longitudinally through the beaters of the other drum.

4. A mixing apparatus for the purpose specified comprising in combination an outer jacketed casing for receiving the materials to be mixed, a drum mounted for rotation within said casing with its outer periphery closely adjacent the inner wall of the casing and adapted to carry around the material in the casing, beaters arranged in the interior periphery of said drum, a second drum disposed within the periphery of the outer drum and having exterior beaters interengaging those of the inner drum, and said drums being adapted for rotation in opposite directions.

In witness whereof I have signed this specification in the presence of two witnesses.

ARCHIBALD MONTGOMERY LOW.

Witnesses:
R. E. SUGAR,
L. W. BROWNING.